US012737557B2

(12) United States Patent
Rezajoo et al.

(10) Patent No.: US 12,737,557 B2
(45) Date of Patent: Sep. 15, 2026

(54) GUI FOR LAYERED TRANSFORMATIVE AI DATA ARTICLE COMPRESSION

(71) Applicant: Truist Bank, Charlotte, NC (US)

(72) Inventors: Ali Rezajoo, Charlotte, NC (US); James Harrison Creager, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 232 days.

(21) Appl. No.: 18/491,090

(22) Filed: Oct. 20, 2023

(65) Prior Publication Data

US 2025/0131205 A1 Apr. 24, 2025

(51) Int. Cl.

| | |
|---|---|
| ***G06F 3/048*** | (2013.01) |
| ***G06F 40/166*** | (2020.01) |
| ***G06F 40/40*** | (2020.01) |
| ***G06N 3/044*** | (2023.01) |
| ***G06N 3/0464*** | (2023.01) |
| *G06F 3/04842* | (2022.01) |

(52) U.S. Cl.
CPC ............ *G06F 40/40* (2020.01); *G06F 40/166* (2020.01); *G06N 3/044* (2023.01); *G06N 3/0464* (2023.01); *G06F 3/04842* (2013.01)

(58) Field of Classification Search
CPC .... G06F 40/40; G06F 40/166; G06F 3/04842; G06N 3/0464; G06N 3/044
See application file for complete search history.

(56) References Cited

U.S. PATENT DOCUMENTS

| | | | | |
|---|---|---|---|---|
| 10,453,454 | B2 * | 10/2019 | Homma | G10L 15/22 |
| 10,585,991 | B2 * | 3/2020 | Miller | G06F 40/35 |
| 11,172,272 | B2 * | 11/2021 | Wang | H04N 21/8547 |
| 11,500,917 | B2 * | 11/2022 | Wu | G06F 16/438 |
| 11,580,350 | B2 * | 2/2023 | Wu | G06N 3/08 |
| 12,393,875 | B2 * | 8/2025 | Strope | G06N 3/0464 |
| 12,518,447 | B2 | 1/2026 | Dibia | |
| 2017/0083200 | A1 * | 3/2017 | Bartley | G06F 40/47 |
| 2018/0373705 | A1 * | 12/2018 | Kwon | G06F 40/47 |
| 2019/0108282 | A1 * | 4/2019 | Zeng | G06F 16/9535 |
| 2019/0327330 | A1 | 10/2019 | Natarajan | |
| 2019/0370336 | A1 * | 12/2019 | Prakash | G06N 3/084 |
| 2020/0143384 | A1 | 5/2020 | Koontz | |
| 2021/0326536 | A1 * | 10/2021 | Hutchins | G06N 5/022 |
| 2024/0089903 | A1 * | 3/2024 | Monteuuis | H04W 12/121 |
| 2024/0185490 | A1 * | 6/2024 | Dibia | G06N 20/10 |
| 2024/0320684 | A1 | 9/2024 | Ramalingam | |
| 2025/0131204 | A1 | 4/2025 | Rezajoo | |

(Continued)

*Primary Examiner* — David Phantana-angkool
(74) *Attorney, Agent, or Firm* — Michael A. Springs, Esq.; Shumaker, Loop & Kendrick, LLP; Patrick B. Horne

(57) ABSTRACT

A system for generating a graphical user interface for prompting layered transformative data article compression by artificial intelligence is configured to generate a second data article by, at least in part, compressing a first data article using a first AI algorithm trained by a machine-learning technique, and send the second data article with instructions to display at least a portion of the second data article at the user device. Compressing the first data article using the AI algorithm includes: generating an interim data article by the AI algorithm translating the first data article in at least one user-profile agnostic iteration; and generating the second data article by the AI algorithm translating the interim data article in at least one user-profile dependent iteration.

20 Claims, 10 Drawing Sheets

(56) References Cited

U.S. PATENT DOCUMENTS

| | | | | |
|---|---|---|---|---|
| 2025/0131205 | A1 | 4/2025 | Rezajoo | |
| 2025/0181982 | A1 | 6/2025 | Everest | |
| 2025/0258994 | A1* | 8/2025 | Plotkin | G06F 40/274 |
| 2025/0265413 | A1* | 8/2025 | Hernandez | G06F 40/284 |
| 2025/0298973 | A1* | 9/2025 | Haleva | G06F 40/205 |
| 2025/0315630 | A1* | 10/2025 | Shernan | G06F 40/40 |
| 2025/0329256 | A1* | 10/2025 | Balasubramanian | H04W 4/40 |

* cited by examiner

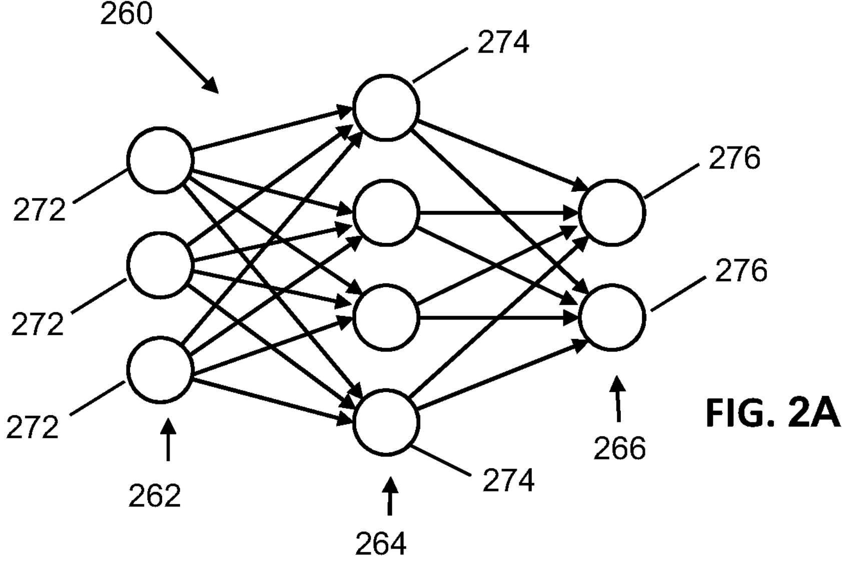
FIG. 2A
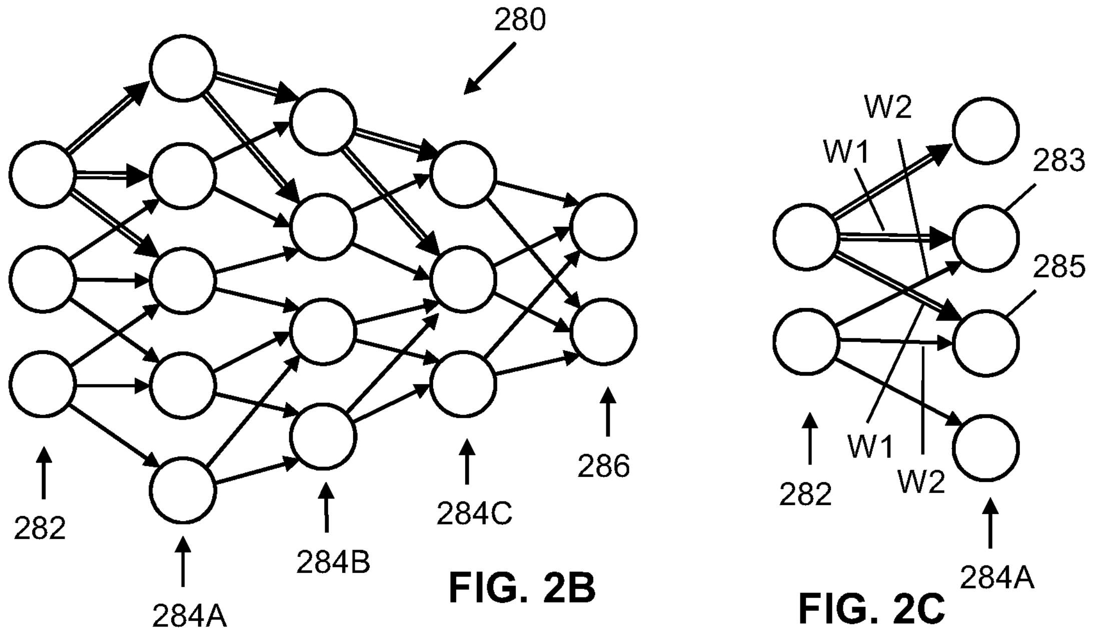
FIG. 2B
FIG. 2C

GUI FOR LAYERED TRANSFORMATIVE AI DATA ARTICLE COMPRESSION

FIELD

This invention relates generally to the field of data article compression, and more particularly to a graphical user interface (GUI) for conveying transformative compression by implemented in part by use of artificial intelligence (AI).

BACKGROUND

Conventional paper flow handling of information and resources has been largely replaced by use of computerized data storage and digital transactions. This opens opportunities for document exchanges previously unavailable. Appointments including sit-down meetings attended by parties or their representatives were once prevalent. Signatures applied by hand to binding documents were optionally preceded or accompanied by personal explanations of terms and agreements. Such approaches are being replaced in some instances and fields with arrangements in which parties are distant and offset in time zones, the parties needing not to actually meet in person, or at all.

However, particularly as new accounts are to opened or other new binding arrangements are to be initiated, terms and conditions and conditions needing formal acknowledgement and agreement can be lengthy beyond typical human patience, especially if a portable device such as a mobile phone is being used to peruse documents. A human-nature pattern has arisen by which some people profess they just scroll and click to accept terms and conditions, which brings to question whether full disclosure successfully reached their attention and whether all parties have knowingly indeed entered a contract.

Other issues regarding accessibility of disclosure documents arise when, for example, a blind user with a screen reader has difficulty navigating multiple files, and for further example, when language fluency with documents in any given one language is not assured among all user. Even users with practical conversational skills in a language can be daunted by the length and obtuse terms of some documents.

Prewritten disclosures can be provided to potential clients of a given business, and questions may arise as they review their content. Even if such potential clients contact human agents by phone, chat, or by visiting a business branch location, the available agents may be unprepared to answer their questions, particularly when complex documents detail terms and conditions for products and services. This can lead to time inefficiencies and frustration both for clients and agents.

Automated processing of documents is arising in which not only are paper documents being obsolesced by contractually equivalent electronic versions, their contents are being ingested by AI based processing.

Improvements are needed in assuring documents are reviewed with comprehension by their intended audiences, for example user entering agreements. Improvements are needed toward user comprehension of long documents and other articles of data, which without some degree of automated assistance, may go un-reviewed or otherwise tacitly accepted with their due respect.

BRIEF SUMMARY

Embodiments of the present invention address the above needs and/or achieve other advantages by providing apparatuses and methods for transformative data article compression at least in part by artificial intelligence (AI).

A system, according to at least one embodiment, for generating a graphical user interface for prompting layered transformative data article compression at least in part by artificial intelligence (AI). The system includes a computing system of a first entity including one or more processor configured to execute computer-readable instructions, at least one of a memory device and a non-transitory storage device storing a user profile associated with a user device, and a communication interface for operatively connecting the one or more processor to the user device via a communication network. Upon execution of the computer-readable instructions, the one or more processor operates the computing system to: access a first data article; transmit the first data article via the communication network with instructions to generate a graphical user interface that displays at least a portion of the first data article and an operable compression request selector at the user device; receive a selector signal indicative of user action on the operable compression request selector; generate a second data article by, at least in part, compressing the first data article using an AI algorithm trained by a machine-learning technique; and send the second data article via the communication network with instructions to display at least a portion of the second data article at the user device. Compressing the first data article using the AI algorithm includes: generating an interim data article by the AI algorithm translating the first data article in at least one user-profile agnostic iteration; and generating the second data article by the AI algorithm translating the interim data article in at least one user-profile dependent iteration.

Generating an interim data article by the AI algorithm translating the first data article in at least one user-profile agnostic iteration may include translating content of the first data article from a first language to a second language of the second data article.

The second language may be in a natural language format and the first language may be in at least one of a legal format and a technical format.

Generating an interim data article by the AI algorithm translating the first data article in at least one user-profile agnostic iteration may include at least one of: shortening content of the first data article; summarizing content of the first data article; and simplifying content of the first data article.

Generating an interim data article by the AI algorithm translating the first data article in at least one user-profile agnostic iteration may include at least one of: shortening content of the first data article while maintaining semantic meaning; decomposing at least one sentence longer than a threshold number of words into multiple sentences each having a number of words less than the threshold number of words; and replacing at least one word having a threshold number of letters with one or more replacement words extracted from a thesaurus, the one or more replacement words each having less than the threshold number of letters.

Generating the second data article by the AI algorithm translating the interim data article in at least one user-profile dependent iteration may include accessing the user profile and at least one of: checking a user preference; deducing a user preference; and inferring a user preference.

The first data article may include at least one of: information about an offering by the first entity; and, terms and conditions for an offering by the first entity.

Furthermore, a system according to at least one embodiment and to which the above examples and options apply, is provided for a computing system to generate a graphical user interface for prompting layered transformative data article compression at least in part by artificial intelligence (AI). The system includes a computing system of a first entity including one or more processor configured to execute computer-readable instructions, at least one of a memory device and a non-transitory storage device, and a communication interface for operatively connecting the one or more processor to a user device via a communication network, the at least one of a memory device and a non-transitory storage device storing a user profile associated with the user device. Upon execution of the computer-readable instructions, the one or more processor operates the computing system to: access a first data article; generate a second data article by, at least in part, compressing the first data article using an AI algorithm trained by a machine-learning technique; and send the second data article via the communication network with instructions to generate a graphical user interface that displays at least a portion of the second data article at the user device. Compressing the first data article using the AI algorithm includes: generating an interim data article by the AI algorithm translating the first data article in at least one user-profile agnostic iteration; and generating the second data article by the AI algorithm translating the interim data article in at least one user-profile dependent iteration.

A method, according to at least one embodiment and to which the above examples and options apply, is provided for a computing system to generate a graphical user interface for prompting layered transformative data article compression at least in part by artificial intelligence (AI), the computing system being of a first entity and including one or more processor configured to execute computer-readable instructions, at least one of a memory device and a non-transitory storage device storing a user profile associated with a user device, and a communication interface for operatively connecting the one or more processor to the user device via a communication network. The method includes, upon executing the computer-readable instructions, the one or more processor operating the computing system to: access a first data article; transmit the first data article via the communication network with instructions to generate a graphical user interface that displays at least a portion of the first data article and an operable compression request selector at the user device; receive a selector signal indicative of user action on the operable compression request selector; generate a second data article by, at least in part, compressing the first data article using a first AI algorithm trained by a machine-learning technique; and send the second data article via the communication network with instructions to display at least a portion of the second data article at the user device. Compressing the first data article using the AI algorithm includes: generating an interim data article by the AI algorithm translating the first data article in at least one user-profile agnostic iteration; and generating the second data article by the AI algorithm translating the interim data article in at least one user-profile dependent iteration.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE SEVERAL VIEWS OF THE DRAWINGS

Figure 1:
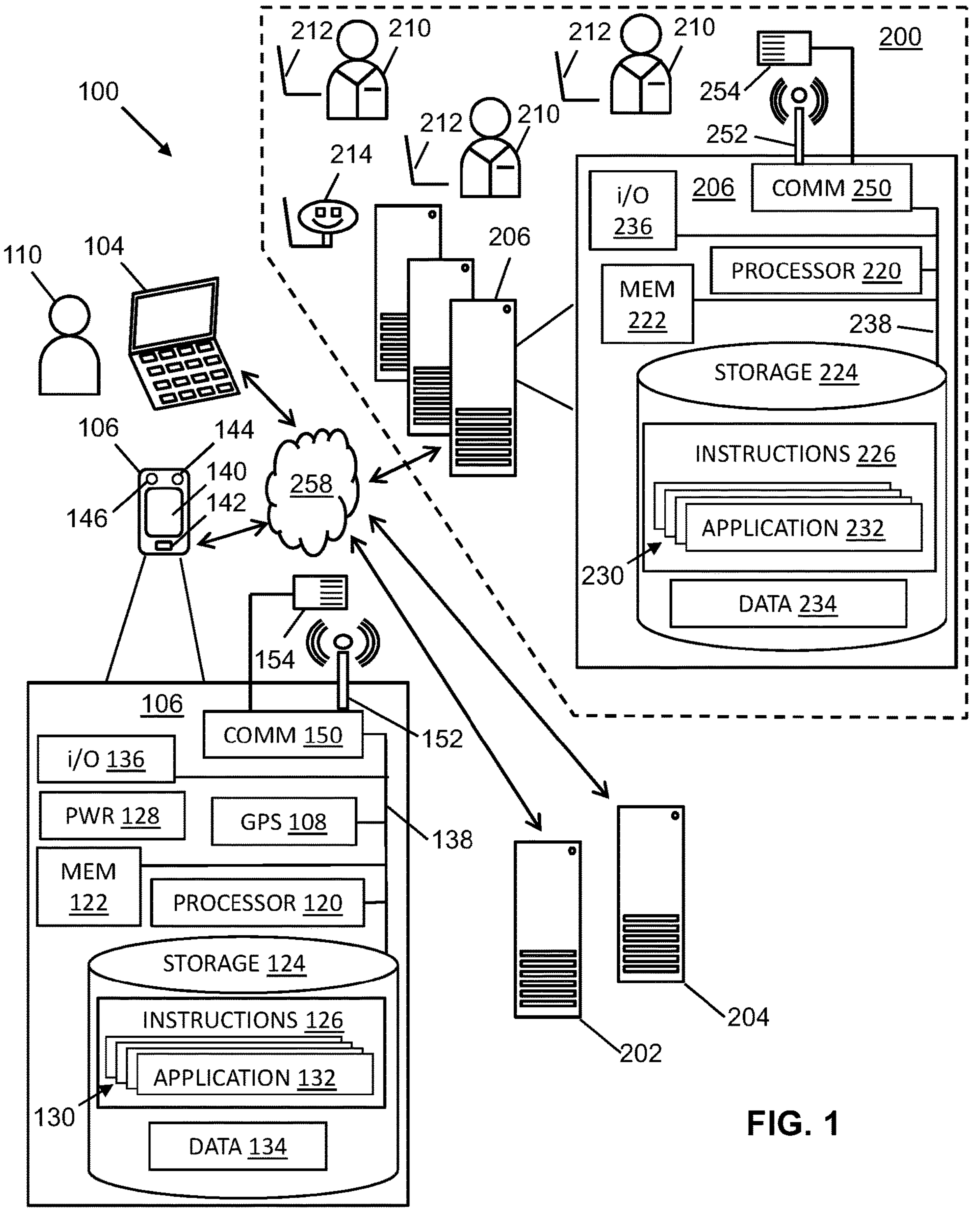

Having thus described embodiments of the invention in general terms, reference will now be made to the accompanying drawings, wherein:

FIG. 1 illustrates an enterprise system, and environment thereof, according to at least one embodiment.

FIG. 2A is a diagram of a feedforward network, according to at least one embodiment, utilized in machine learning FIG. 2B is a diagram of a convolutional neural network (CNN), according to at least one embodiment, utilized in machine learning.

FIG. 2C is a diagram of a portion of the convolutional neural network of FIG. 2B, according to at least one embodiment, illustrating assigned weights at connections or neurons.

Figure 3:
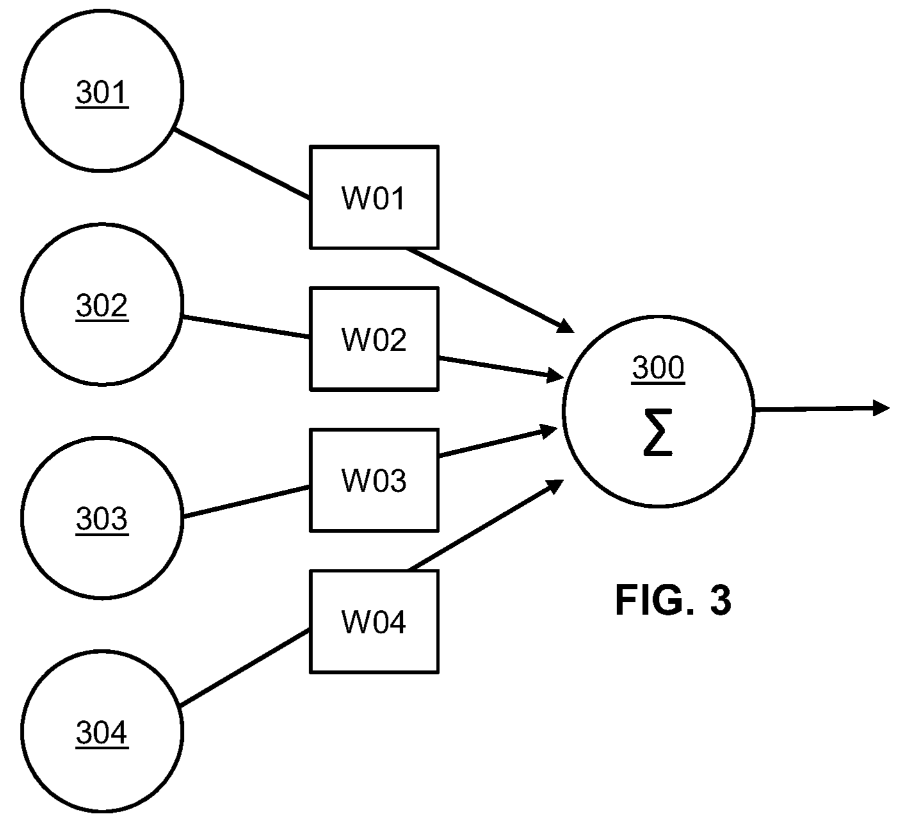

FIG. 3 is a diagram representing an exemplary weighted sum computation in a node in an artificial neural network.

Figure 4:
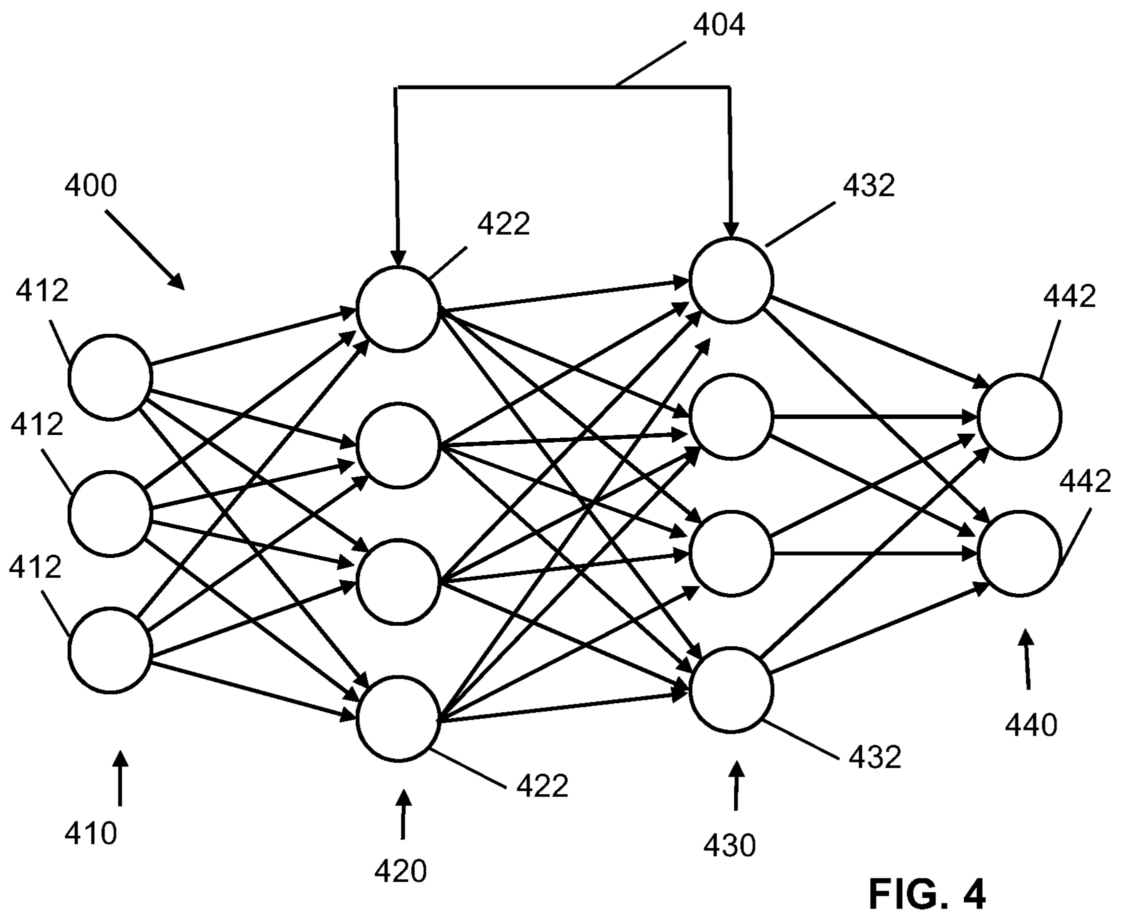

FIG. 4 is a diagram of a Recurrent Neural Network RNN, according to at least one embodiment, utilized in machine learning.

Figure 5:
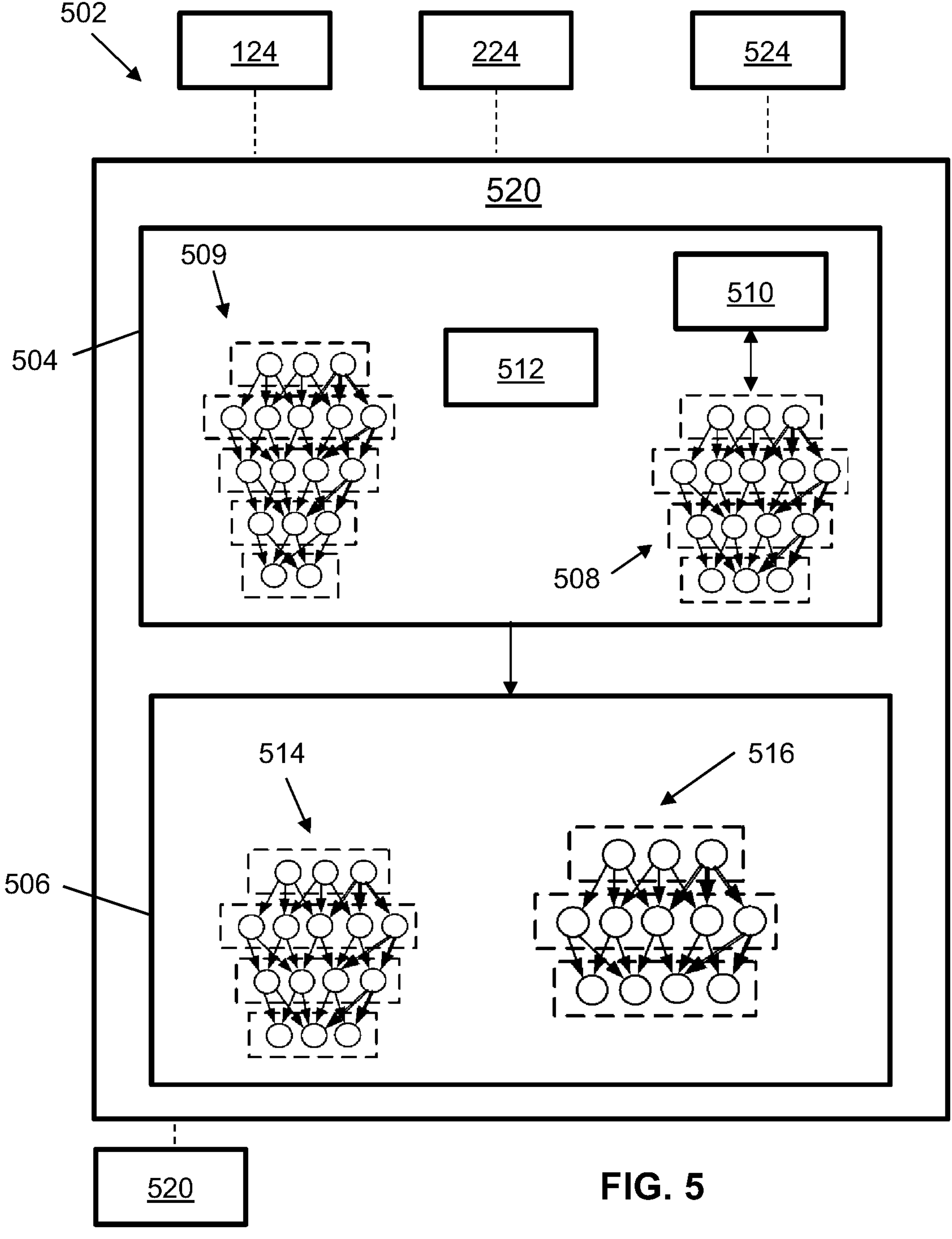

FIG. 5 is a schematic logic diagram of an artificial intelligence program including a front-end and a back-end algorithm.

Figure 6:
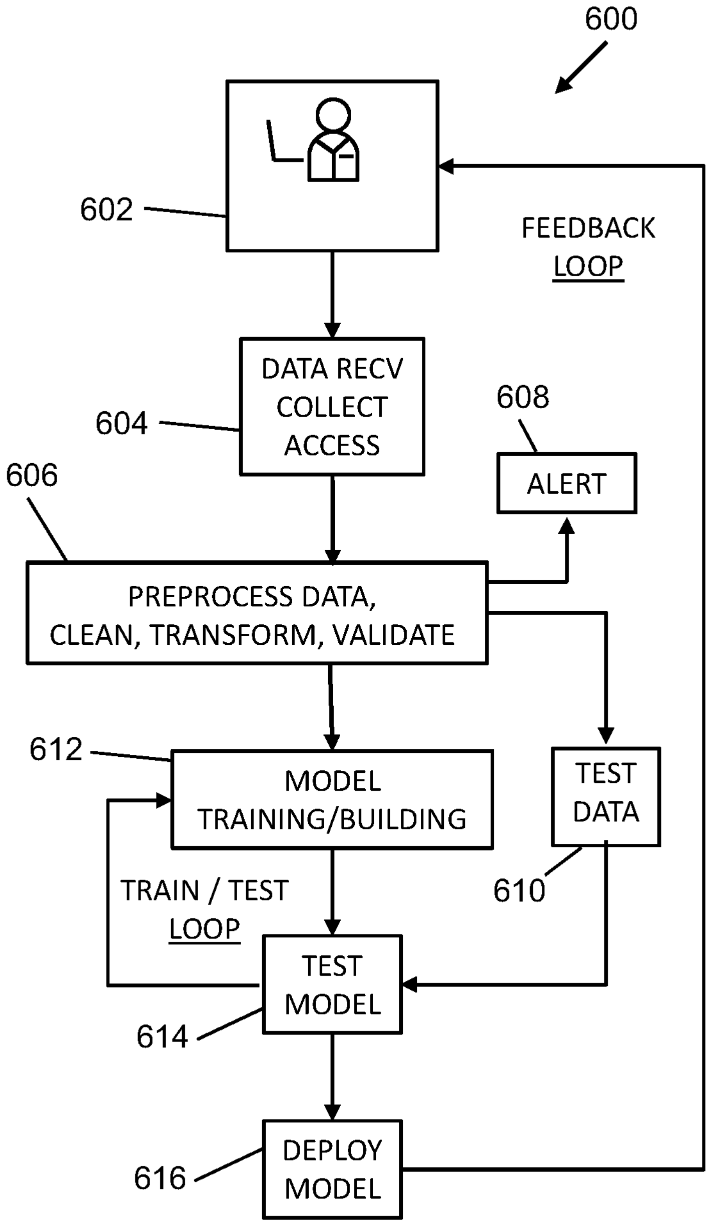

FIG. 6 is a flow chart representing a method, according to at least one embodiment, of model development and deployment by machine learning.

Figure 7:
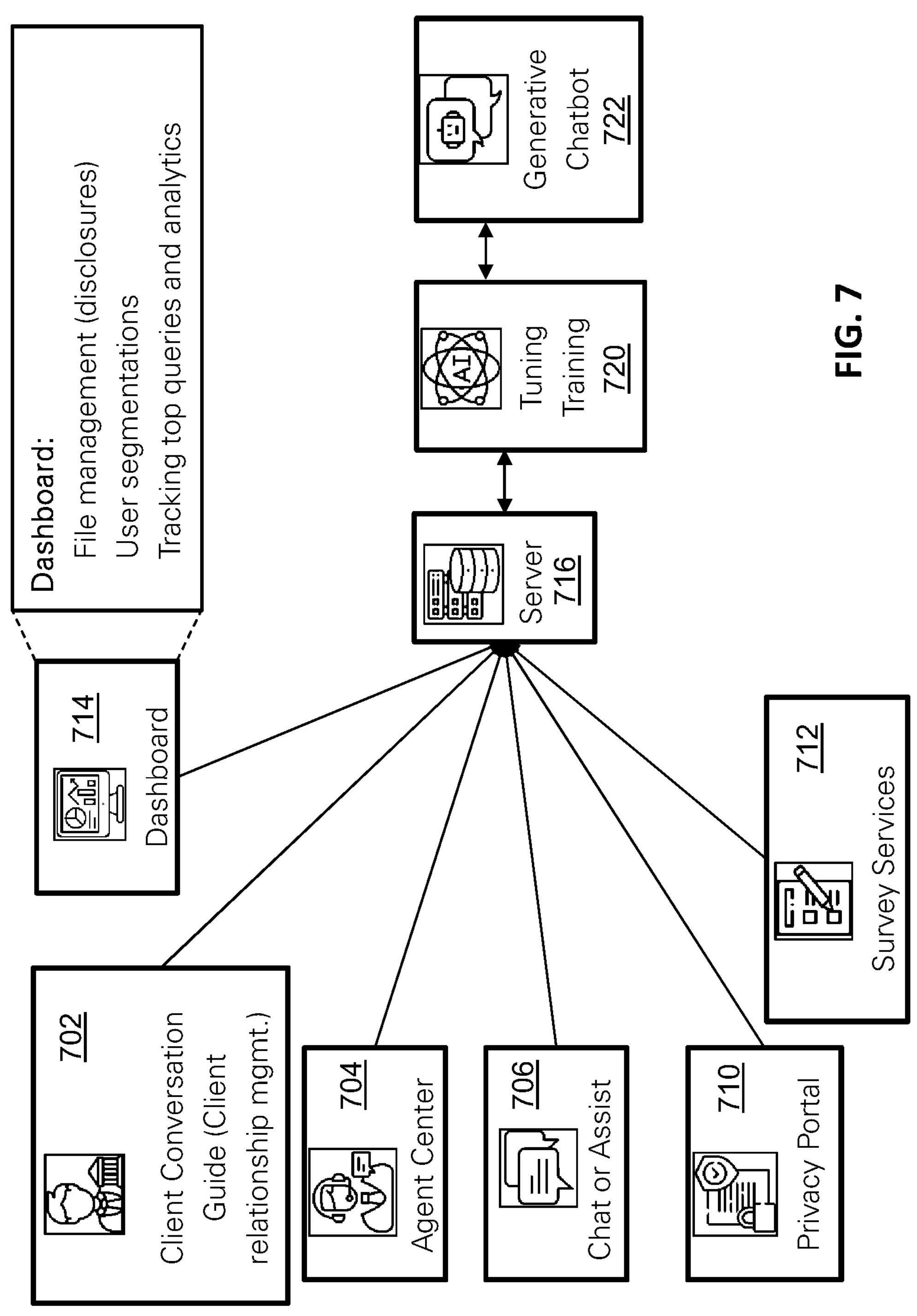

FIG. 7 shows non-limiting examples of information flow sources for use in user profile construction and AI training.

Figure 8:
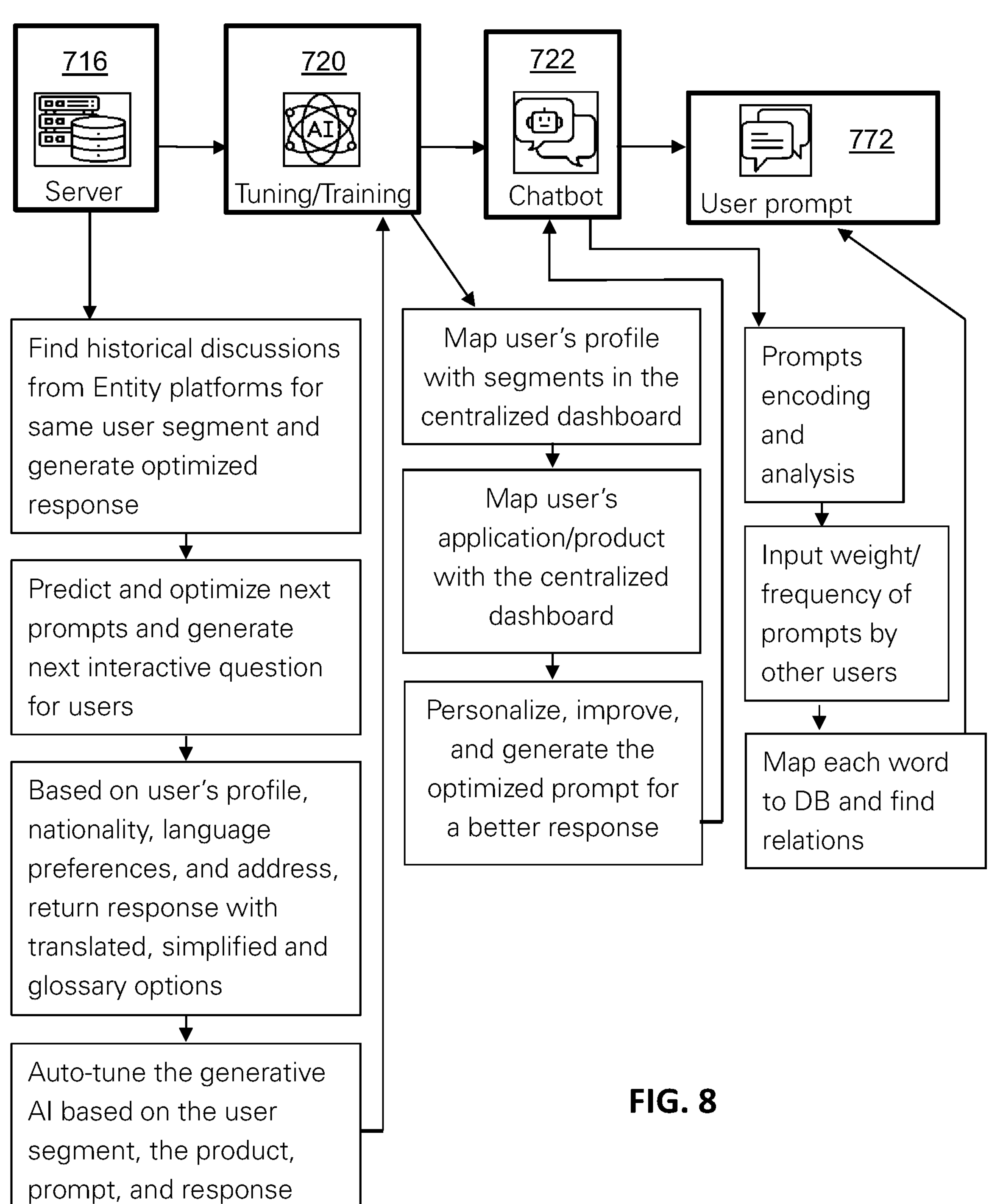

FIG. 8 is a flow chart and system organizational diagram for implementation of transformative AI data article compression according to at least one embodiment.

Figure 9:
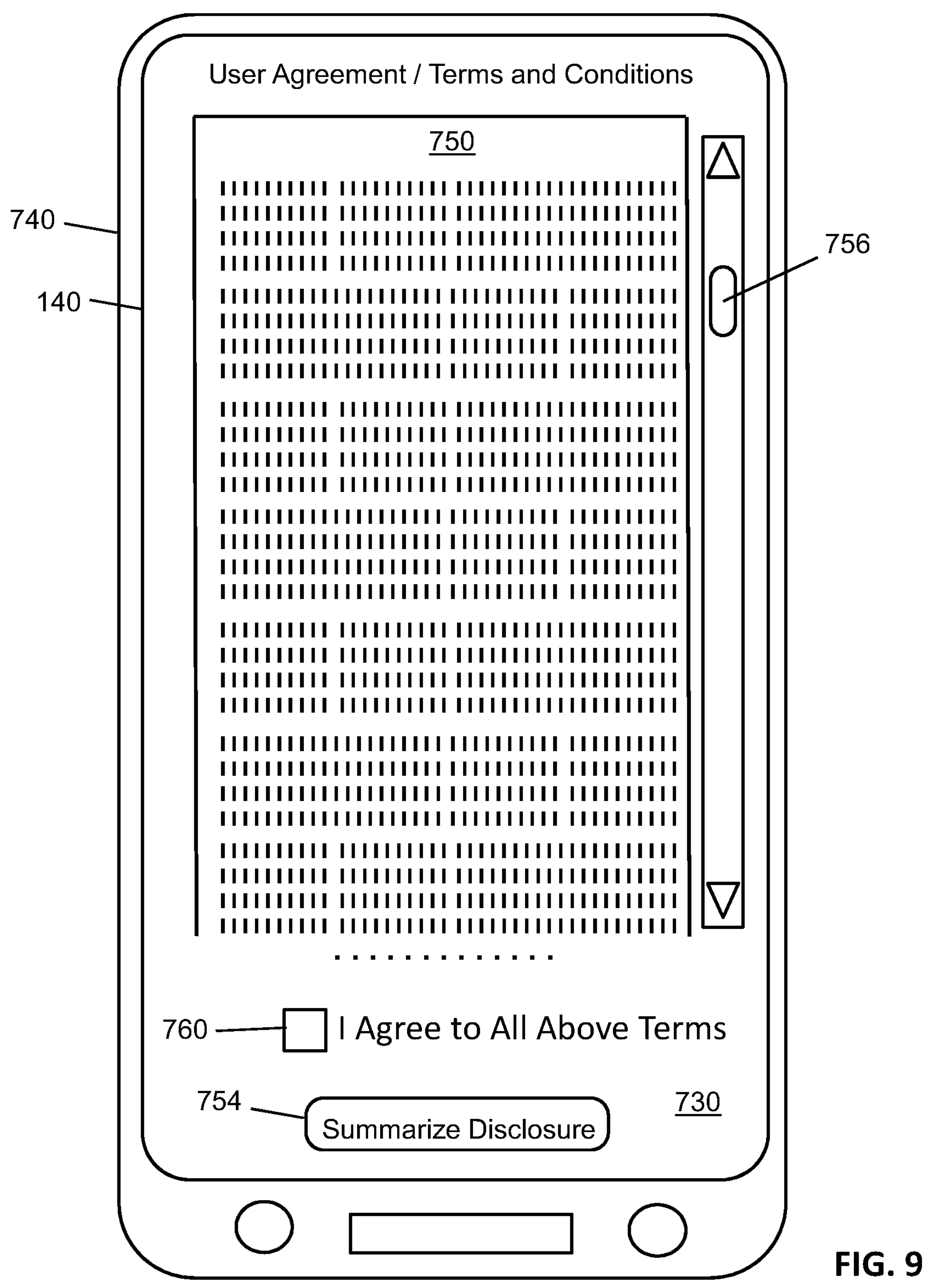

FIG. 9 depicts a user device in use in conjunction with transformative AI data article compression according to at least one embodiment.

Figure 10:
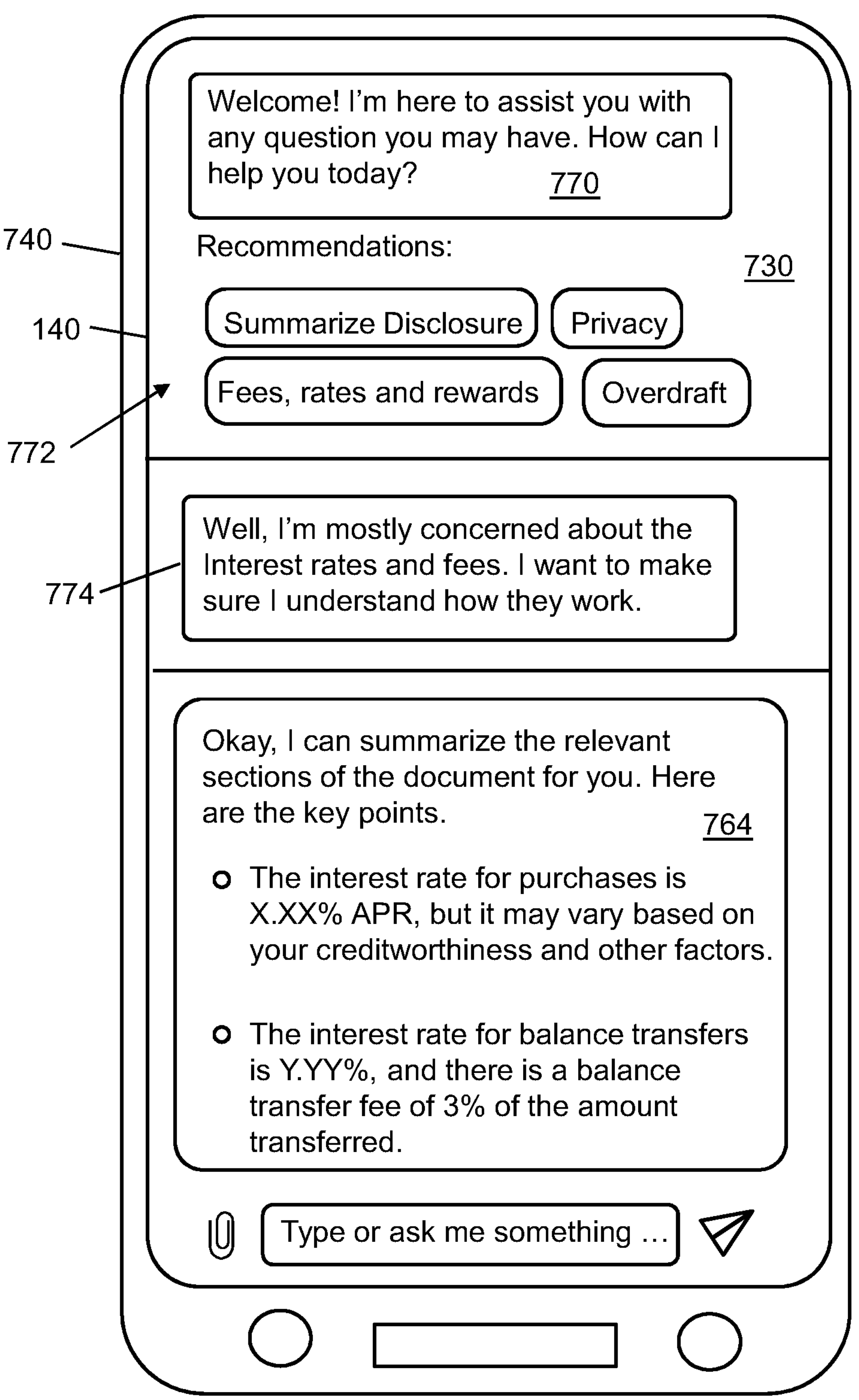

FIG. 10 depicts the user device of FIG. 9 displaying an article generated by AI data article compression and corresponds to an example in which the article regards terms offered by the first entity.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of a computing system reference as an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern.

Other authentication processes are also contemplated herein including, for example, email authentication, password protected authentication, device verification of saved devices, code-generated authentication, text message authentication, phone call authentication, etc. The user device may enable users to input any number or combination of authentication systems.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

Systems and methods in various embodiments are provided to facilitate documentation ingestion and comprehension by generating a graphical user interface (GUI) for prompting automatic transformative data article compression at least in part by artificial intelligence (AI). Data articles, such as legal documents, financial documents, contracts, offers of services, and descriptions of products and/or services and associated fees and terms are compressed and simplified for user viewing or other user perception. The transformative process generates an output article that is generally more brief and can be restructured, reorganized, and translated into a same-language lay-person interpretation of a source article. The transformative process can be guided by user action at a user device upon the device displaying some portion of a source data article, and prompted by further user action upon encountering terms or content for which assistance is desired.

For example, a user may navigate content of a source data article, termed herein also a first data article, by use of a scrolling function within or part of a GUI, and may prompt automated compression of some of the content by AI processing by further user action, which can be user initiated or may be system suggested with user acknowledgment or selection. An operable compression request selector is provided within or part of the GUI to facilitate user action to prompt automated compression in some implementations in which the output article is generated responsively to receipt of a selector signal indicative of user action on the operable compression request selector. The output article is termed herein also a second data article without regard to whether the output article is a first generation compression product based on the source data article. Automatic transformative data article compression at least in part by artificial intelligence (AI) refers as well to iterative and/or recursive compression stages in which any number of interim data articles are generated, for example each further processed to ultimately produce the output article by looped feedback AI processing. The iterative and/or recursive compression stages may be, for example, sequentially user-profile agnostic and user-profile dependent (aware).

These systems, methods, and devices are thus practical toward generating a graphical user interface (GUI) for prompting a transformation by artificial intelligence (AI) by adding, over prior technology, elements reflecting improvements in the functioning of a computer by automating the generation of data articles by compression, which effects a transformation or reduction of a particular article into a different state or thing, such as a transformation of a first data article into a more brief and comprehensible second data article tailored to a user's preferred language or other preferences.

The output second data article can be tailored for comprehension by and interest of the user, for example in a natural language format familiar to the user according to, in various non-limiting examples, user profile settings, aggregated information about the user, acquired information about the user, and information about the user entered by the user. Thus user preference can be expressed by the user, know by history between the user and first entity, and can further be deduced and/or inferred, for example by AI ingestion of user communications history and user profile details.

As used herein, the terms "enterprise" or "provider" generally describes an entity, which can be a business enterprise or a person that hosts, maintains, or uses the disclosed systems and methods. The term "article" can be used to generally refer to alphanumeric text in digital form and can be used interchangeably with the terms alphanumeric data, alphanumeric text, alphanumeric textual data, feedback data, and textual data. The term "user" can be used interchangeably with the term participant and refers to humans that generate linguistic expressions of ideas included in user inputs, replies, signals, and article that can be processed using artificial intelligence and natural language processing technologies.

The transformative data article compression described herein can include processing the source data articles using natural language processing technology that is implemented by one or more artificial intelligence software applications and systems. The artificial intelligence software and systems are in turn implemented using simulated neural networks. Iterative training techniques and training data instill neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

The entity, or first entity, can in various implementations be described as an enterprise entity, a business entity, a retailer, a merchant entity, a financial institution, a bank, or other service and/or product provider. As such, the first entity may maintain or have access to, user profiles and accounts. Questions for any given user in any given session can be tailored to their situation, according to user information maintained in or in association with such user profiles and accounts.

In some inventive embodiments described herein, a first entity and/or enterprise entity herein provides financial services and operates as a financial institution. The first entity may be previously and currently engaging a user in a range of services such as checking, credit card, debit card, mortgage, and savings account services. In such cases, where the user is a highly engaged client, the service entity has direct access to data regarding credit cards, checking, savings, and other financial arrangements and means. In such examples and others, the first entity maintains account records, each associated with a respective one of multiple user entities, for example as represented in FIG. 1 as data 234, which can include, as non-limiting examples, cached data, and files such as those for user accounts, user profiles, account balances, and transaction histories.

For security and confidentiality purposes, account records are generally secured from unauthorized access. Thus, the account records of a particular user are inaccessible without user authentication. However, even prior to or without such authentication, an agent or system of the first entity may conduct a communication session and provide information, for example, about multiple services made available at least in part by the first entity. In examples of the first entity and/or enterprise entity providing financial services and/or operating as a financial institution, the services made available and for which information can be disseminated prior to or without user authentication can include, as non-limiting examples, policies and offerings for checking, credit card, debit card, mortgage, and savings account services, and the information disseminated can be provided without specific user account details in the absence of user authentication.

The account records of a particular user, in some examples, are made accessible to the user during a bidirectional communication session upon user authentication by the user. For example, a username and password implemented as a security code may be provided to satisfy user authentication and/or further security measures may be applied. Upon user authentication, user access to accounts and actions may be permitted such as balance requests, funds transfers, funds conversions, and other information access and action regarding user owned or user associated assets.

An advantageous aspect of inventive interface elements described herein regards compatibility and with screen readers, which are software programs that allow blind or visually impaired users to read text that is displayed on a screen with, for example, a speech synthesizer or braille display. A screen reader serves as an interface between the computer's operating system, its applications, and the user. Commands are sent by the user pressing key combinations on the keyboard or braille display to prompt the synthesizer and/or braille display what to say and/or output automatically when changes do or would otherwise occur on a computer screen. A command can instruct the synthesizer and/or braille display to read or spell a word, read a line or full screen of text, find a text string, announce the location of a cursor or focused item, and so on. Users can perform advanced functions, such as locating items such as text and/or icons displayed in any particular color, indicating a color change, and reading pre-designated parts of a screen on demand, reading highlighted text, and identifying an active choice in a menu. Users may also use a spell checker or read the cells of a spreadsheet with a screen reader or braille display. Screen readers are currently available for use with personal computers running Linux, Windows, and Mac, IOS, Android, and more, and the inventive interface elements described herein are compatible and configured for use with same.

Display, displaying, causing to display, causing display, and similar terms in these descriptions refer at least to visible presentations on user devices and/or agent devices. These and similar terms also refer to virtual reality (VR) presentations, augmented reality (AR) presentations. These and similar terms also refer to the effected outputs of screen readers, which may be audible, and braille displays, which may at least in part be mechanical and/or tactile. These systems, methods, and devices are implemented to serve a wide audience, including those with sight impairment, those with hearing impairment. Display herein can be used referring to such actions as present and disseminate, to include audio and tactile presentations under the term display.

In a non-limiting example, during account opening, the first entity is seeking to provide terms and conditions, the acceptance of which is required of users to open an account. Various account types may be offered, such as investment accounts, credit card accounts, and others. In some cases, service agreements are dozens of pages long, and as such are not easily understood by users, particularly given that a user may be attempting to establish an account using a portable device with a limited-size screen and has very limited time and patience. Such data articles are subject to transformative data article compression for benefit of both the user and the first entity. Further non-limiting examples where AI processing is utilized for data article compression include overdraft protection documents, legal compliance documents and their confirmation, and surveys.

A user may be an established customer, or a new customer, such as a student first applying for a credit card, applying for overdraft protection, or purchasing or utilizing another product or service. Communications with the user can be used to tailor summaries generated by the generative AI described herein. Non-limiting examples of information flow sources for use in user profile construction and AI training are shown in FIG. 7. In each occurrence of a user visiting a branch location or communicating with entity agents, be that human or virtual agents, communications can be logged via a Client Conversation Guide (CCG) platform 702 (Client relationship mgmt). Agent centers 704 receive calls and provide assistance, online and text support is also available via chat or first-entity assist 706 including human and virtual agents. A privacy portal 710 permits secure user access to their accounts. Information gathering 712 by surveys can be conducted via survey services, which may be provided by third parties.

A centralized dashboard 714 can gather available data, comments, and survey data altogether into a database, including any variety of documents and other first data articles. In addition to uploading and gathering all such data via the dashboard, segmentation of data articles and users serves to enable a tuning and training system for generative AI to effect personalized transformative data article compression.

Accumulated data is ingested at a server 716, part of or utilized by the enterprise system 200, for tuning and training 720 an AI algorithm by one or more machine-learning technique. The action or function of the AI algorithm can be represented as and referenced by a generative chat bot 722 (FIG. 7), and virtual agent 214 (FIG. 1).

Many candidate data sources accumulating information into one or more database, accessible to the server 716 and navigable by agents via the dashboard 714, serve to tune and train the generative AI. This makes information available and ingested for use by generative AI to automatically transform data articles for better comprehension and use by users via processing tailored to the user.

Demographic information, profile information, and requested information can be utilized by the deployed generative AI, implemented as chat bot 722, virtual agent 214, or other deployment. An age of the user can be used in assessing eligibility and preferences. A user initiating an assistance session can request assistance in understanding particular parts of data articles regarding terms and conditions, for example to acquire a credit card to establish a credit score.

Personal information may already be available via user account information for an existing registered user, such as in a customer information file (CIF) or other profile. Alternatively and additionally, the user may be questioned for date of birth and other information for example drop downs, menus, and such to determine, for example, employment status. Sample non-limiting questions include the following. How old are you? Are you a student? Are you employed? What type of job titles you have? Thus users can provide age, occupation and other information. User information can be used for audience segmentation for a tailored user experience. For example, young professionals represent a segment, young professional meaning for example users under thirty five years of age, and having for example, 50 k (USD) investable assets. The accumulated information via these and other examples can be logged and stored to create a customer information file (CIF) and profile by submitting the information through a profile-generating platform which can be termed a sieve CIF generator.

As represented in FIG. 8, the server 716 can mine logged historical discussions from entity platforms, for example from same or similar user segments as that of any given user, and generate optimized responses to requests. Responses and auto-tuning the generative AI can be based on a user's profile, nationality, language preferences, and address, as non-limiting examples, and can return responses in translated, simplified terms, with glossary options provided for selection by or tailored to the user. The generative AI can be automatically tuned (auto-tuned) based on the user segment, the product, various prompts, and responses.

The tuning and training 720 of the AI algorithm by one or more machine-learning technique enables the system to map a user profile with segments in the centralized dashboard, map user applications and products with the centralized dashboard, and personalize, improve, and generate the optimized prompt for a better response. The chat bot 722 can prompt encoding and analysis, can input weight and frequency of prompts by other users, and map words to the database and find relations. Tuning and training as referenced by 720 in FIG. 7 in various embodiments encompasses contextual training using profile contents to configure the structure and logic in implementing chat bot functions automating assistive and transformative interactive real time communication between user and chat bots 722. Thus systems and methods in various embodiments are provided to generate a graphical user interface (GUI) for automatic transformative data article compression by artificial intelligence (AI).

Before proceeding with further descriptions of the inventive graphical user interface for prompting transformative data article compression at least in part by artificial intelligence (AI), these description turn now to FIG. 2A through FIG. 6. As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g,, CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

The above described systems and methods, in various embodiments, are implemented at least in generating a graphical user interface (GUI) 730 (FIG. 9) for automatic transformative data article compression by artificial intelligence (AI). In at least the immediately below descriptions, reference numbers are provided correlating terms to examples of elements in the drawings (FIGS.), without limitation of those terms to such correlations. Implemented as a system 200, a computing system 206 of a first entity includes one or more processor 220 configured to execute computer-readable instructions 226, at least one of a memory device 222 and a non-transitory storage device 224, and a communication interface 236 for operatively connecting, via a communication network 258, the one or more processor to a user device 740 (FIG. 9).

Upon executing the computer-readable instructions, the one or more processor operates the computing system 206 to access a first data article 750 (FIG. 9), for example from the storage device 224 (FIG. 1) which can store data 234 for data articles including legal documents, financial documents, contracts, offers of services, and descriptions of products and/or service and associated fees and terms, as non-limiting examples. The first data article 750 is transmitted via the communication network 258 with instructions to generate a graphical user interface 730 that displays at least a portion of the first data article and an operable compression request selector 754 at the user device 740, having a display 140.

As described with reference to the user device 106 and 104, which descriptions apply as well to the user device 740, the communication interface 150 (FIG. 1) facilitates communication receiving and sending functions at the user device, and conveying selections and/or answer patterns of the user, to the sender of the first data article. In various system and methods according to embodiments expressly described herein and those inferred therefrom, actions are implemented in at least in some embodiments in cooperation with or through use of a user's portable device 740 as represented in FIG. 9.

In the illustrated example, the first data article 750 is shown as a document too lengthy for single screen reading, for which the graphical user interface 730 provides a scroll tool 756 for use by the user in navigating the document.

The compression request selector 754 at the user device 740 is represented in the illustrated example as a virtual button with the caption "Summarize Disclosure" for user actuation. User action on the selector 754 prompts the sending of a selector signal, for example via communication network 258 (FIG. 1), by the user device indicative of the user action, the signal directed to the sender entity of the first data article, or in some embodiments, a service entity utilized thereby. FIG. 9 also shows an acceptance tool 760 by which the user can acknowledge acceptance and agreement of the first data article 750. User action on the acceptance tool 760 may, for example, prompt a review of another data article or navigation to other content.

The one or more processor operates the computing system 206 to receive the selector signal indicative of user action on the operable compression request selector 754, and generate a second data article by, at least in part, compressing the first data article using a first AI algorithm trained by a machine-learning technique, with reference to the tuning and training 720 of the AI algorithm as described with reference to FIG. 7, according for example to systems and methods described or inferred by FIG. 2A through FIG. 6 and above descriptions thereof. The system further sends the generated second data article 764 (FIG. 10) via the communication network with instructions to display at least a portion of the second data article at the user device 740.

The illustrated example of FIG. 10 corresponds to an example of FIG. 9 in which the first data article 750 regards terms and conditions of a line of credit offered by the first entity. The first data article is compressed using the AI algorithm to generate and output the second data article 764 thereby producing a document that is generally more brief and comprehensible to the user.

The GUI 730 further provides in FIG. 10 additional questions and options, including a greeting 770 with a question of how help can be offered. The GUI 730 thus implements the generative AI chat bot 722 (FIGS. 7, 8), offering user prompts 772 and chat functions for further navigation of documents and assistance. Conversational user input 774 represents the user engaging the chat bot in a real time conversation in a natural language format.

The computing system can conduct an interrogation session of multiple query exchanges, in succession, as represented in FIG. 10. In each exchange, the computing system sends an exchange unique query prompt to the user device, for example as represented at 770. A reply signal, representing a user reply to a question, can be received for each question from the user device as represented as user input or reply 774. The query prompts include, represent, or are questions for the user, and may be generated by an AI algorithm, or selected from pre-existing questions. The system may store at least a portion of the reply signal in a user profile for use in the ongoing and/or future communications so as to update system knowledge of the user. The query prompts are exchange unique, without repeat in any one session, and may thus advance in sophistication and further guide and focus comprehension of the user.

Some embodiments, for example implemented as a system and/or associated method, are provided for conducting query and reply interrogation sessions at least in part by use of an artificial intelligence (AI) algorithm. In such cases, the query prompts as used in the above descriptions are procured, using an AI algorithm trained by a machine learning technique. That is, a session-unique query prompt based at least in part on a user profile, for example a credit rating or other indication of financial standing or need, can be procured by automatically generating the query prompt, and/or by selecting the query prompt, each by use of AI algorithm trained by a machine learning technique.

Using the trained AI algorithm, a session-unique query prompt can be generated based at least in part on the account information of the particular registered user. The AI algorithm can access further information, such as credit rating and accounts information, about an unregistered user from at least one third party source, for example as described above with reference to the external systems 202 and 204 of FIG. 1. These features are beneficial to match each session to user interest and resources.

Using the trained AI algorithm, a query prompt can be selected from a cache, for example based at least in part on the user profile. The cache may include query prompts previously AI generated and/or collected, for example by virtual agents 214, and query prompts accumulated with assistance by human agents 210.

The computing system may procure, for any second or subsequent query exchange in an interrogation session, the exchange unique query prompt based at least in part on the user profile. That is, questions can be procured, whether generated or selected, in view of the user profile so as to provide a customized user experience. In instances in which the query prompt is generated, the query prompt may be using a second AI algorithm trained by one or more machine-learning technique to guide a user toward products and services matching user need and resources.

Compressing the first data article using a first AI algorithm trained by a machine-learning technique includes in some examples translating content of the first data article according at least in part to a stored user profile associated with the user device, thus tailoring the generation of the second data article to match user preferences, for example toward language, vocabulary, and interests. Thus, source data article content can be translated from a first language to a second language, and/or can be shortened, summarized, and simplified for comprehension by a user of the user device. Limited English proficiency (LEP) individuals can be served by the automated translation of an English content data article to another language of an individual's expressed, inferred, or deduced preference. Thus, transformative data article compression at least in part by artificial intelligence (AI) encompasses translation for simplification in the source language of a data article and/or language translation from the source language to another written language.

In some embodiments, transformative data article compression at least in part by artificial intelligence (AI) encompasses automatically shortening the content of the data article while maintaining semantic meaning. Typical source examples of terms and conditions for customer review and acceptance have long sentences despite that shorter sentences can make a contract more readable. Thus one mode of making a document more approachable by compression is by reworking and/or reformatting sentences into sub-sections or breaking them up into two or more sentences. Accordingly compression by AI processing herein may decompose individual sentences longer than a threshold number of words each into multiple sentences each having a number of words less than the threshold number of words.

The threshold number of words, for example, can be fixed or varied, and can be thirty words as a non-limiting example. The threshold can be user-profile agnostic, or "unaware," such that all users or users in a broad segment are applied the same fixed or predetermined word count threshold for sentences in an article being processed. The threshold may be user-profile dependent, or "aware," by varying according to user profile attributes, such as education, age, address, and according to whether the associated user is known, inferred, or deduced to have proficiency in the language in use.

In some embodiments, transformative data article compression at least in part by artificial intelligence (AI) encompasses automatically replacing words having a threshold number of letters with one or more replacement words extracted from a thesaurus, the replacement words each having less than the threshold number of letters. The threshold can be user-profile agnostic, such that all users or all users in a broad segment are applied the same fixed or predetermined letter count threshold for words in an article being processed. The threshold may be user-profile dependent by varying according to user profile attributes, such as education, age, address, and according to whether the associated user is known, inferred, or deduced to have a mastery of the language in use.

Both user-profile agnostic and user-profile dependent iterations are utilized in some implementations of AI processing in route to the output second data article. In some examples, the AI processing encompasses automatically generating an interim data article by the AI algorithm translating a first data article in a user-profile agnostic iteration, and generating the second data article by the AI algorithm translating the interim data article in a user-profile dependent iteration.

Translating a data article from a first language to a second language refers to human spoken and written languages, such as English to Spanish and vice versa. Translating also refers to dialects and language formats. For example, documents in legal and/or technical formats can be translated into a natural language format for user comprehension, with the source articles and the output articles being any same or any two different human spoken and written languages. For example, a source data article may be translated in one iteration from one written language to another, such as English to Spanish, into an interim article, which is then translated into an output article by translation from legalese and/or technical jargon to a natural language format in a user-profile dependent iteration in which the user is known, deduced, or inferred to have limited skills in legal formats and technical formats.

In some embodiments, transformative data article compression at least in part by artificial intelligence (AI) encompasses extracting one or more segments of the data article, such as displaying just the fee information from a long document. In such an example, other portions of the first data article may be transformed, filtered, discriminated, and/or redacted in generating the second data article. Extracted segments may be automatically identified by AI processing in response to user questions, selections, and/or other actions or preferences offered, inferred, or deduced. In some cases, a segment can be extracted and displayed verbatim. For example, one sentence that says "A transfer costs $15" may not need rephrasing, needing only to be automatically found and brought to user attention as, or part of, the generated output article. Thus, segment extraction can be implemented in combination with other shortening modes, for example those that rephrase and/or reword other segments or portions. In some instances, the semantic meaning of an entire first data article need not be maintained or encapsulated in a second data article generated at least in part by artificial intelligence (AI). Instead the semantic meanings of selected or determined portions of the first data article may be maintained or encapsulated, with some segments being extracted verbatim and others subjected to more transformative AI processing such that segment extraction described here can be implemented in any combination with all above described compression implementations in a single compression stage or in iterative stages in any order.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for generating a graphical user interface for prompting layered transformative data article compression at least in part by artificial intelligence (AI), the system comprising:

a computing system of a first entity including at least one processor configured to execute computer-readable instructions, at least one of a memory device and a non-transitory storage device, and a communication interface for operatively connecting the at least one processor to a user device via a communication network, the at least one of a memory device and a non-transitory storage device storing a user profile associated with the user device;

wherein, upon execution of the computer-readable instructions, the at least one processor is configured to:

access a first data article;

transmit the first data article to the user device via the communication network with instructions to generate a graphical user interface that displays at least a portion of the first data article and an operable compression request selector at the user device;

receive from the user device via the communication network a selector signal indicative of user action on the operable compression request selector;

generate a second data article by, at least in part, compressing the first data article using an AI algorithm trained by a machine-learning technique; and send the second data article via the communication network with instructions to display at least a portion of the second data article at the user device, wherein compressing the first data article using the AI algorithm comprises:

generating an interim data article by the AI algorithm translating the first data article in at least one user-profile agnostic iteration;

accessing the user profile; and generating the second data article by the AI algorithm translating the interim data article in at least one user-profile dependent iteration according to at least one setting stored in the user profile.

2. The system of claim 1, wherein generating an interim data article by the AI algorithm translating the first data article in at least one user-profile agnostic iteration comprises translating content of the first data article from a first language to a second language of the second data article.

3. The system of claim 2, wherein the second language comprises a natural language format and the first language comprises at least one of a legal format and a technical format.

4. The system of claim 1, wherein generating an interim data article by the AI algorithm translating the first data article in at least one user-profile agnostic iteration comprises at least one of: shortening content of the first data article; summarizing content of the first data article; and simplifying content of the first data article.

5. The system of claim 1, wherein generating an interim data article by the AI algorithm translating the first data article in at least one user-profile agnostic iteration comprises at least one of:

shortening content of the first data article while maintaining semantic meaning;

decomposing at least one sentence longer than a threshold number of words into multiple sentences each having a number of words less than the threshold number of words; and replacing at least one word having a threshold number of letters with one or more replacement words extracted from a thesaurus, the one or more replacement words each having less than the threshold number of letters.

6. The system of claim 1, wherein generating the second data article by the AI algorithm translating the interim data article in at least one user-profile dependent iteration comprises accessing the user profile and at least one of: checking a user preference; deducing a user preference; and inferring a user preference.

7. The system of claim 1, wherein content of the first data article comprises at least one of: information about an offering by the first entity; and, terms and conditions for an offering by the first entity.

8. A system for generating a graphical user interface for prompting layered transformative data article compression at least in part by artificial intelligence (AI), the system comprising:

a computing system of a first entity including at least one processor configured to execute computer-readable instructions, at least one of a memory device and a non-transitory storage device, and a communication interface for operatively connecting the at least one processor to a user device via a communication network, the at least one of a memory device and a non-transitory storage device storing a user profile associated with the user device;

wherein, upon execution of the computer-readable instructions, the at least one processor is configured to:

access a first data article;

generate a second data article by, at least in part, compressing the first data article using an AI algorithm trained by a machine-learning technique; and send the second data article to the user device via the communication network with instructions to generate a graphical user interface that displays at least a portion of the second data article at the user device, wherein compressing the first data article using the AI algorithm comprises:

generating an interim data article by the AI algorithm translating the first data article in at least one user-profile agnostic iteration;

accessing the user profile; and generating the second data article by the AI algorithm translating the interim data article in at least one user-profile dependent iteration according to at least one setting stored in the user profile.

9. The system of claim 8, wherein generating an interim data article by the AI algorithm translating the first data article in at least one user-profile agnostic iteration comprises translating content of the first data article from a first language to a second language of the second data article.

10. The system of claim 9, wherein the second language comprises a natural language format and the first language comprises at least one of a legal format and a technical format.

11. The system of claim 8, wherein generating an interim data article by the AI algorithm translating the first data article in at least one user-profile agnostic iteration comprises at least one of: shortening content of the first data article; summarizing content of the first data article; and simplifying content of the first data article.

12. The system of claim 8, wherein generating an interim data article by the AI algorithm translating the first data article in at least one user-profile agnostic iteration comprises at least one of:

shortening content of the first data article while maintaining semantic meaning;

decomposing at least one sentence longer than a threshold number of words into multiple sentences each having a number of words less than the threshold number of words; and replacing at least one word having a threshold number of letters with one or more replacement words extracted from a thesaurus, the replacement words each having less than the threshold number of letters.

13. The system of claim 8, wherein generating the second data article by the AI algorithm translating the interim data article in at least one user-profile dependent iteration comprises accessing the user profile and at least one of: checking a user preference; deducing a user preference; and inferring a user preference.

14. The system of claim 8, wherein content of the first data article comprises at least one of: information about an offering by the first entity; and, terms and conditions for an offering by the first entity.

15. A method for a computing system to generate a graphical user interface for prompting transformative data article compression at least in part by artificial intelligence (AI), the computing system being of a first entity and including at least one processor configured to execute computer-readable instructions, at least one of a memory device and a non-transitory storage device, and a communication interface for operatively connecting the at least one processor to a user device via a communication network, the at least one of a memory device and a non-transitory storage device storing a user profile associated with the user device, the method comprising, upon executing the computer-readable instructions, the at least one processor operating the computing system to:

access a first data article;

transmit the first data article to the user device via the communication network with instructions to generate a graphical user interface that displays at least a portion of the first data article and an operable compression request selector at the user device;

receive from the user device via the communication network a selector signal indicative of user action on the operable compression request selector;

generate a second data article by, at least in part, compressing the first data article using an AI algorithm trained by a machine-learning technique; and send the second data article via the communication network with instructions to display at least a portion of the second data article at the user device, wherein compressing the first data article using the AI algorithm comprises:

generating an interim data article by the AI algorithm translating the first data article in at least one user-profile agnostic iteration;

accessing the user profile; and generating the second data article by the AI algorithm translating the interim data article in at least one user-profile dependent iteration according to at least one setting stored in the user profile.

16. The method of claim 15, wherein generating an interim data article by the AI algorithm translating the first data article in at least one user-profile agnostic iteration comprises translating content of the first data article from a first language to a second language of the second data article.

17. The method of claim 16, wherein the second language comprises a natural language format and the first language comprises at least one of a legal format and a technical format.

18. The method of claim 15, wherein generating an interim data article by the AI algorithm translating the first data article in at least one user-profile agnostic iteration comprises at least one of: shortening content of the first data article; summarizing content of the first data article; and simplifying content of the first data article.

19. The method of claim 15, wherein generating an interim data article by the AI algorithm translating the first data article in at least one user-profile agnostic iteration comprises at least one of:

shortening content of the first data article while maintaining semantic meaning;

decomposing at least one sentence longer than a threshold number of words into multiple sentences each having a number of words less than the threshold number of words; and replacing at least one word having a threshold number of letters with one or more replacement words extracted from a thesaurus, the replacement words each having less than the threshold number of letters.

20. The method of claim 15, wherein generating the second data article by the AI algorithm translating the interim data article in at least one user-profile dependent iteration comprises accessing the user profile and at least one of: checking a user preference; deducing a user preference; and inferring a user preference.

* * * * *